United States Patent
Leigh et al.

(10) Patent No.: US 11,445,248 B1
(45) Date of Patent: Sep. 13, 2022

(54) POOLING USER INTERFACE (UI) ENGINES FOR CLOUD UI RENDERING

(71) Applicant: Synamedia Limited, Staines Upon Thames (GB)

(72) Inventors: Anthony Leigh, Workingham (GB); Elyashiv Zalevsky, Tzur Hadassah (IL); Peter Benjamin Matthews, Basingstoke (GB)

(73) Assignee: Synamedia Limited, Staines Upon (GB)

( * ) Notice: Subject to any disclaimer, the term of this patent is extended or adjusted under 35 U.S.C. 154(b) by 0 days.

(21) Appl. No.: 17/234,275

(22) Filed: Apr. 19, 2021

(51) Int. Cl.
| | |
|---|---|
| H04N 21/443 | (2011.01) |
| H04N 21/239 | (2011.01) |
| H04N 21/235 | (2011.01) |
| H04L 67/566 | (2022.01) |
| G06F 9/451 | (2018.01) |
| G06F 9/455 | (2018.01) |

(52) U.S. Cl.
CPC ......... H04N 21/4437 (2013.01); G06F 9/451 (2018.02); G06F 9/45558 (2013.01); H04L 29/08765 (2013.01); H04L 67/2833 (2013.01); H04N 21/235 (2013.01); H04N 21/2393 (2013.01); G06F 2009/4557 (2013.01)

(58) Field of Classification Search
CPC ....... H04L 29/06448–06469; H04L 29/08765; H04L 41/5012–5016; H04L 41/5051; H04L 65/4069–4092; H04L 67/2833; H04N 21/23; H04N 21/23109; H04N 21/239–24; H04N 21/27–278; H04N 21/40; H04N 21/42204; H04N 21/42209–42216; H04N 21/43074; H04N 21/431–4318; H04N 21/443–4438; H04N 21/47–4758
See application file for complete search history.

(56) References Cited

U.S. PATENT DOCUMENTS

| | | | |
|---|---|---|---|
| 9,210,028 B1 * | 12/2015 | Pinson ................ | H04L 65/4084 |
| 10,091,121 B2 * | 10/2018 | Yen ........................ | H04L 69/18 |
| 2012/0131144 A1 * | 5/2012 | Cooper ................ | H04L 65/604 |
| | | | 709/219 |
| 2012/0140750 A1 * | 6/2012 | Yan ...................... | H04N 21/658 |
| | | | 370/338 |

(Continued)

FOREIGN PATENT DOCUMENTS

WO WO-2013181756 A1 * 12/2013 ......... H04N 21/2743

*Primary Examiner* — Brendan Y Higa
(74) *Attorney, Agent, or Firm* — Fernando & Partners, LLP

(57) ABSTRACT

Techniques for rendering user interface (UI) in a virtual set top system using a pooling of UI rendering engines is performed at a device (e.g., a server or a cloud computing platform). The pooling method includes receiving multiple requests for UIs from multiple client devices, where the multiple requests include states of the UIs. The method further includes dividing the multiple requests into a plurality of groups based at least in part on the states of the UIs, where a respective group of the plurality of groups corresponds to requests for a set of UIs from a respective set of client devices. The method additionally includes assigning a pool of UI engines in a virtual machine (VM) to render the set of UIs for the respective set of client devices based on one or more characteristics of the set of UIs and characteristics of the respective group.

20 Claims, 7 Drawing Sheets

(56) References Cited

U.S. PATENT DOCUMENTS

| | | | | |
|---|---|---|---|---|
| 2014/0122641 A1* | 5/2014 | Dorairaj | ............ | H04N 21/2396 |
| | | | | 709/217 |
| 2014/0129680 A1* | 5/2014 | Mukherjee | ........... | H04L 65/602 |
| | | | | 709/219 |
| 2015/0244818 A1* | 8/2015 | Dorairaj | ................. | H04L 67/16 |
| | | | | 709/203 |
| 2017/0214632 A1* | 7/2017 | Ravi | .................. | H04L 41/5054 |

\* cited by examiner

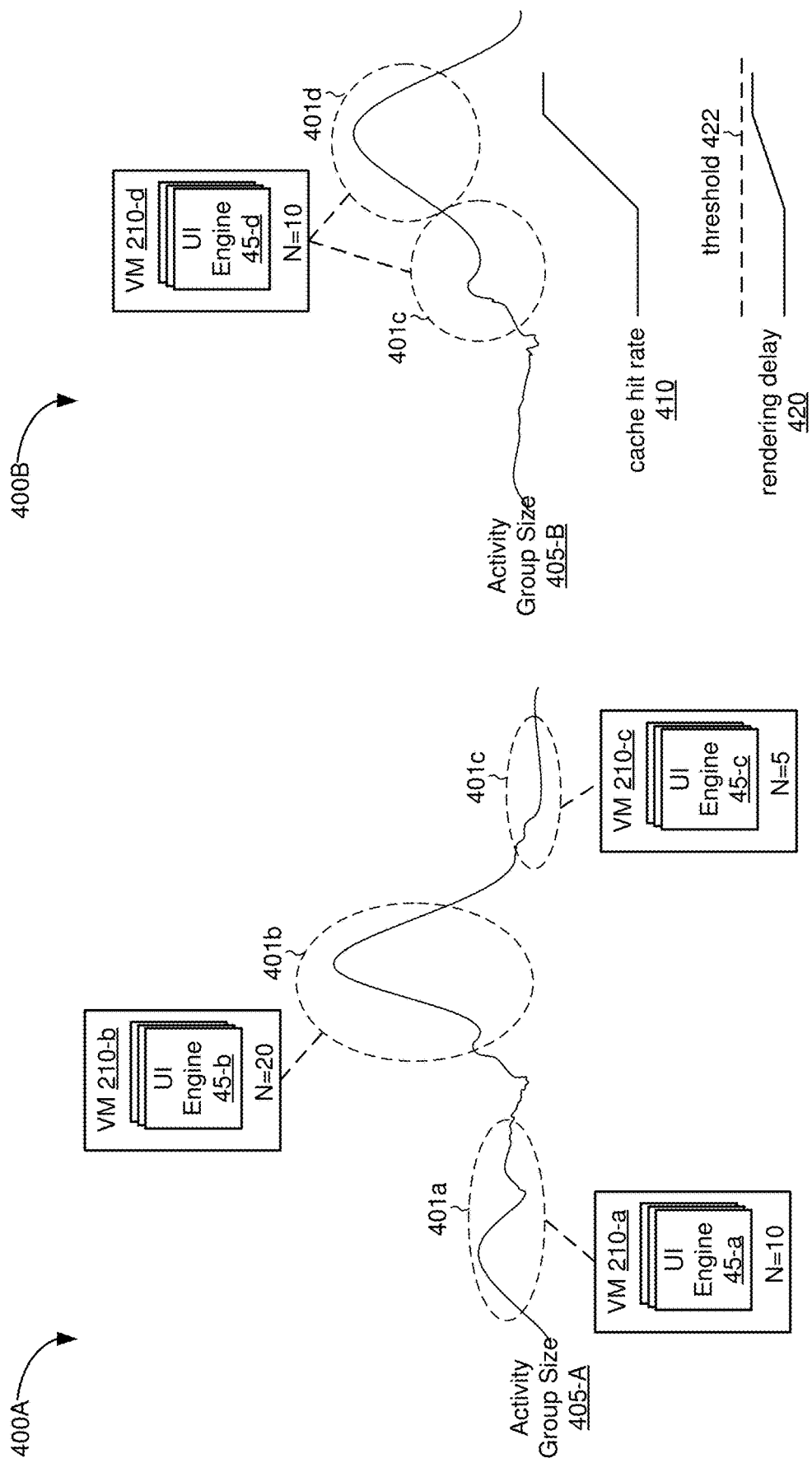

500

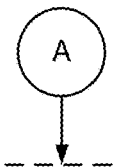

Maintain a cache for storing rendered UI objects that are shared by the pool of UI engines, and obtain a cache hit rate of the rendered UI objects, including a cache hit rate of the rendered UI objects associated with the set of UIs ~550

Assigning the pool of UI engines in the VM to render the set of UIs for the respective set of client devices based on the one or more characteristics of the set of UIs and the respective group includes adjusting a density of the pool of UI engines in the VM based on the cache hit rate of the rendered UI objects associated with the set of UIs and in accordance with a rendering delay of the respective group below a threshold ~552

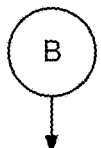

Dividing the multiple requests into the plurality of groups based at least in part on the states of the UIs includes dividing the multiple requests into the plurality of groups based on geographics derived from the states of the UI; and the respective group of the plurality of groups corresponds to the requests for the set of UIs from the respective set of client devices proximate a respective geographical region ~560

Predict a size of the respective group local to the respective geographical region; and adjust a density of the pool of UI engines in the VM according to the size of the respective group ~562

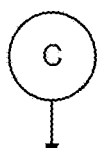

Deploy a plurality of VMs, including the VM, running on the one or more processors, each of the plurality of VMs hosts a respective pool of UI engines and corresponds to a respective application for rendering the UIs ~570

Figure 5B

POOLING USER INTERFACE (UI) ENGINES FOR CLOUD UI RENDERING

TECHNICAL FIELD

The present disclosure relates generally to virtualizing a set top system for multimedia content delivery and, more specifically, to pooling user interface (UI) engines to render UIs in the cloud in a virtual set top system.

BACKGROUND

In a virtual set top system for multimedia content delivery, moving user interface rendering to the cloud and producing streams for user interactions face many challenges. Some previously existing methods, devices, and systems attempt to provide high quality user experience by having dedicated resources render user interfaces (UIs) for each client. Such solutions are costly, e.g., consuming a tremendous amount of cloud resources.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 4A and 4B are diagrams illustrating UI engine pooling according to properties of UI requests, in accordance with some embodiments; and FIGS. 5A and 5B are flowcharts illustrating a method of pooling UI rendering engines for cloud UI rendering in the exemplary virtual set top system, in accordance with some embodiments.

Figure 1:
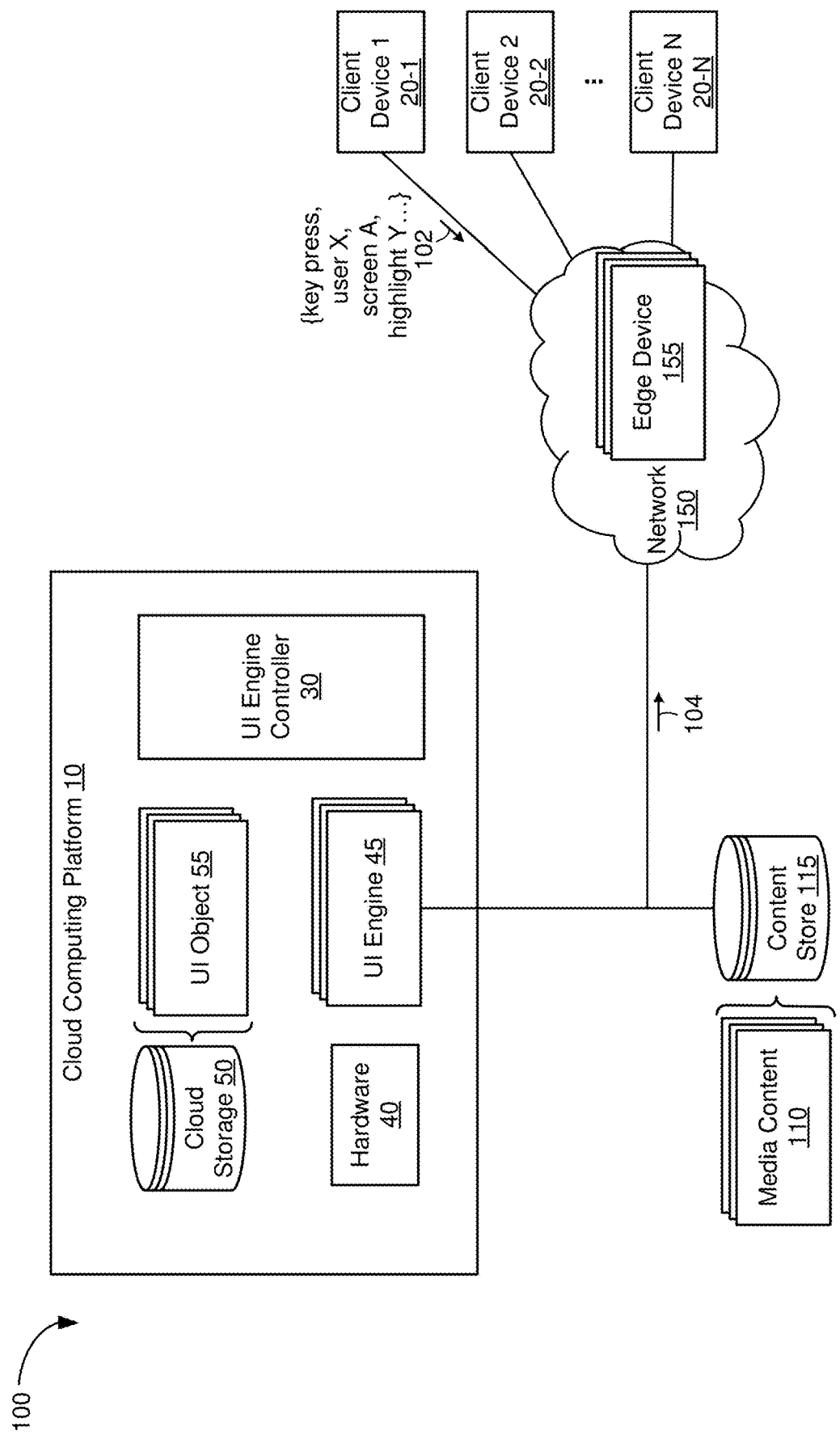
FIG. 1 is a block diagram of an exemplary virtual set top system for media content delivery, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, a virtual set top system described herein pools a plurality of user interface (UI) engines to render UIs in the cloud for set-top-boxes (STBs). In particular, the virtual set top system includes a UI engine controller in the cloud that utilizes virtual machines (VMs) and UI engine pooling to lower the overall cost. The UI engine controller pools UI engines to run multiple copies of an application and prepares them for UI interactions. When multiple client devices send state information associated with the UI interactions, based on the state information, the UI engine controller groups the UI requests and assigns UI engines to render UIs for the multiple client devices. The UI engine controller further adjusts resources allocated to the VMs and/or the UI engines based on demands and/or key metrics from the UI engines it is managing to enable fast UI rendering. Accordingly, with the UI engine controller, the virtual set top system described herein provides high quality user experience at a low cost.

In accordance with various embodiments, a method of pooling UI rendering engines for virtual set top is performed at a device (e.g., a server, a cloud platform) with one or more processors and a non-transitory memory. The method includes receiving multiple requests for user interfaces (UIs) from multiple client devices, where the multiple requests include states of the UIs on the multiple client devices. The method further includes dividing the multiple requests into a plurality of groups based at least in part on the states of the UIs, where a respective group of the plurality of groups corresponds to requests for a set of UIs from a respective set of client devices. The method additionally includes assigning a pool of UI engines in a virtual machine (VM) to render the set of UIs for the respective set of client devices based on one or more of characteristics of the set of UIs and characteristics of the respective group.

EXAMPLE EMBODIMENTS

The virtual set top system described herein solves the aforementioned performance and cost issues associated with set-top-box (STB) virtualization. Instead of having dedicated cloud resources render user interfaces (UIs) for each client, the virtual set top system groups UI requests from multiple clients based on activities (e.g., certain user interactions) and pools UI engines to render for the activities. Because many user behaviors on TV UIs are predictable and repeated, many activities and UI interactions are common. Thus, pooling resources and rendering for the common activities reduce the overhead of rendering the same UIs over and over. Further, by maintaining the pooled resources, e.g., proactively or reactively scaling up or down the resources allocated to the pool, the virtual set top system described herein uses cloud resources efficiently for fast UI rendering, thus improving user experience.

Reference is now made to FIG. 1, which is a block diagram of an exemplary virtual set top system 100 for media content delivery in accordance with some embodiments. The media content (also referred to herein after as "multimedia content", "media content item(s)", or "content") can include any multimedia data, such as visual data, audio data, and/or text, etc. In some embodiments, the virtual set top system 100 includes a cloud computing platform 10 that obtains media content 110 from a content store 115, e.g., recorded content and/or live broadcast. The cloud computing platform 10 renders UIs for a plurality of client devices 20, e.g., client device 1 20-1, client device 2 20-2, ..., client device N 20-N, etc., and delivers both the media content obtained from the content store 110 and the rendered UIs via a network 150 to the plurality of client devices 20. In some embodiments, the network 150 further includes a plurality of edge devices 155 and/or content delivery networks (not shown) that bring computation and data storage closer to the plurality of client devices 20.

In some embodiments, to render the UIs for the plurality of client devices 20, the cloud computing platform 10 includes a UI engine controller 30 that maintains cloud computing resources, such as virtual machines and/or pool(s) of UI engines 45 (also referred to as the UI rendering engines 45). The virtual machines run on top of hardware 40, e.g., CPU(s) and/or GPU(s), and execute programs or instructions for UI rendering in accordance with some embodiments. In some embodiments, each of the virtual machines corresponds to one application for UI rendering. An application as used herein refers to an executable program, or a listing of instructions for execution, that defines a UI for display on a display device. In some embodiments, each of the virtual machines hosts a pool of UI engines 45 that runs as multiple instances of the application and serves as virtual set-top-boxes (STBs) for the plurality of client devices 20. In other words, the pool of UI engines 45 renders UIs for the plurality of client devices 20 on the cloud computing platform 10. In some embodiments, as will be described in further detail below, the pool of UI engines 45 utilizes shared UI objects 55 stored in a cloud storage 50. The UI objects 55 are rendered UI elements and/or rendered UI interactions and are shared by the pool of UI engines 45 for fast rendering.

For example, the UI engine controller 30 receives a request 102 for a UI from client device 1 20-1, e.g., a request for a TV guide. In some embodiments, the UI request 102 includes state information in session state cookies along with the request 102. In some embodiments, the state information indicates UI being displayed (e.g., screen A), UI being requested (e.g., the UI in response to highlighting a tile Y), a user profile (e.g., user X), and/or user interactions (e.g., a key press), among others. In some embodiments, the session state cookies also include network information (e.g., client IP), geographical information, client user agent, timestamp, household identifier, device identifier, device type, media content item identifier, etc. Based on the state information derived from the session state cookies along with the request 102, the UI engine controller 30 allocates a UI engine 45 from the cloud computing resources to render the TV guide for client device 1 20-1. The selected UI engine 45 renders the TV guide on the cloud computing platform 10. The rendered UI is then combined with the media content associated with the TV guide and delivered in one or more streams 104 to client device 1 20-1 via the network 150.

The cloud computing platform 10 thus moves UI rendering into the cloud and streams the rendered UI along with the media content to client device 1 20-1. Upon receiving the media content and the rendered UI, client device 1 20-1 reconstructs (e.g., decodes) the images and properly displays the UI and the media content. When multiple UI requests are received from the client devices 20, the cloud computing platform 10 simultaneously renders multiple UIs for the multiple client devices 20. Instead of allocating one dedicated UI engine 45 as a virtual STB in response to one UI request, as will be described in further detail below, the cloud computing platform 10 uses the pool of UI engines 45 to collectively and efficiently handle the multiple requests. As such, under the management of the UI engine controller 30, a few UI engines 45 in a pool can handle a large volume of requests and serves as virtual STB s for many client devices 20, e.g., the number of UI engines 45 in a pool is less than the number of client devices 20 serviced by the pool of UI engines 45. Accordingly, the cloud computing platform 10 described herein lowers the overall cost of cloud UI rendering.

From the client perspective, the users interacting with client devices 20-1 perceive the application that they are interacting with to be executing in the client environment, whereas the actual executions are taking place on the cloud computing platform 10. As such, a minimal subset of support functions (e.g., the implementation of a return channel for user input and/or video stream decoding) on each of the client devices 20 is sufficient to play the UI and/or the media content, and that the complex function of UI rendering is done by the cloud computing platform 10. Thus, even a very low-cost device, with the common capability of displaying videos, can realize high quality and low latency user experience.

It should be noted that although a single cloud computing platform 10 is illustrated in FIG. 1, the virtual set top system 100 may include one or more cloud computing platforms 10 and the multiple components in the cloud computing platform 10 can be distributed and/or not co-located. For the sake of simplicity, the subject matter will be described hereinafter for the most part with reference to a single cloud computing platform 10. Further, although the content store 115 is illustrated as a separate component from the cloud computing platform 10 in FIG. 1, the content store 115 and/or the encoding of the associated media content can be part of the cloud computing platform 10. Additionally, one or more components and/or functions of the cloud computing platform 10 may be distributed to the edge devices 150. As such, the virtual set top system 100 can include more, less, and/or different elements than shown in FIG. 1. Each of the component in the virtual set top system 100 can include appropriate hardware, software, and/or firmware to perform the operations attributed to the element herein. Operation(s) attributed to an element in the virtual set top system 100 herein should not be considered binding and in some embodiments, other element(s) in the exemplary system 100 may additionally or alternatively perform such operation(s).

Figure 2:
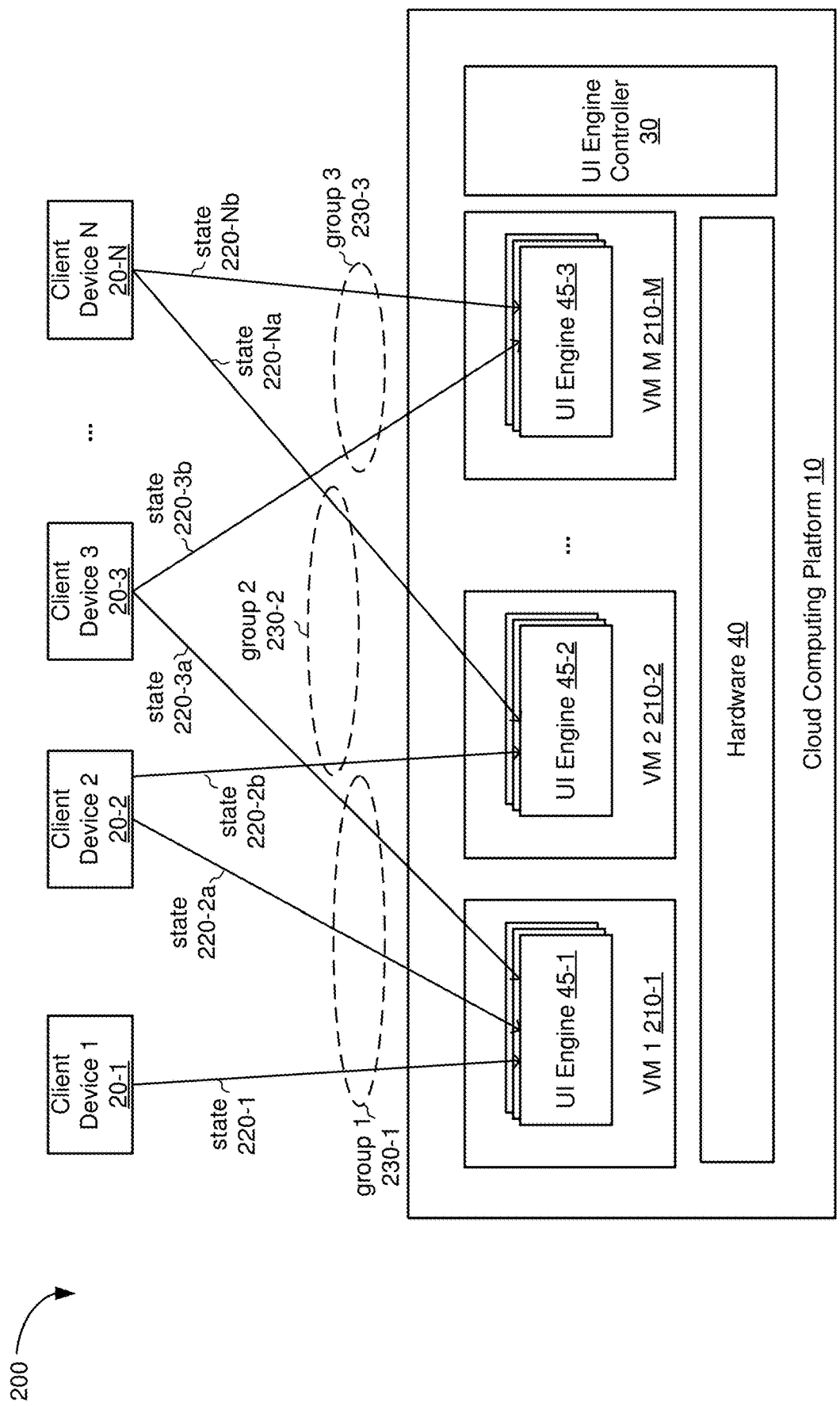
FIG. 2 is a block diagram illustrating grouping UI requests for cloud UI rendering in the exemplary virtual set top system, in accordance with some embodiments.

FIG. 2 is a diagram 200 illustrating grouping UI requests for cloud rendering in the exemplary virtual set top system 100 (FIG. 1), in accordance with some embodiments. In some embodiments, the cloud computing platform 10 runs a plurality of virtual machines 210 on top of the hardware 40, e.g., running VM 1 210-1, VM 2 210-2, ..., VM M 210-M. Each of the VMs 210 hosts a respective pool of UI engines 45, e.g., VM 1 210-1 hosts UI engines 45-1, VM 2 210-2 hosts UI engines 45-2, ..., VM M 210-M hosts UI engines 45-3. It should be noted that the virtual system running on top of the hardware 40 is not limited to any particular implementation. For example, a multitenancy architecture can be implemented such that multiple instances of an application operate in a shared environment. In another example, application containerization, e.g., Kubernetes, can be deployed that runs distributed applications.

In some embodiments, the UI engines 45 are configured to include a web browser, a script interpreter, operating system, or other computer-based environment that is accessed during operations of an application. The UI engine controller 30 maintains the VMs 210 as well as the UI engines 45, including but not limited to allocating resources, adjusting the density of each UI engine pool, and/or selecting the UI engine(s) 45 to render UIs for the plurality of client devices 20.

As described above with reference to FIG. 1, when the plurality of client devices 20 sends UI requests, e.g., the request 102 in FIG. 1, the UI requests include state information 220, e.g., in session state cookies. In some embodiments, the state information 220 indicates UI being requested, user interactions, network information (e.g., client IP), geographical information, client user agent, timestamp, household identifier, device identifier, device type, media content item identifier, etc. For instance, the request from client device 1 20-1 may include a session state cookie that indicate a state 220-1, such as a button is pressed by the user of client device 1 20-1 when watching a video. Likewise, the cloud computing platform 10 receives state information from other client devices 20-2, 20-3, . . . , 20-N, e.g., receiving states 220-2a and 220-2b from client device 2 20-2 at various points in time, receiving states 220-3a and 220-3b from client device 3 20-3 at various points in time, . . . , receiving states 220-Na and 220-Nb from client device N 20-N at various points in time, etc.

In some embodiments, the UI engine controller 30 groups the requests into activity groups 230 (also referred to hereinafter as the groups), e.g., group 1 230-1, group 2 230-2, and group 3 230-3, etc., based on the state information 220. For example, based on the states 220-1, 220-2a, and 220-3a, the UI engine controller 30 groups the UI requests from client device 1 20-1, client device 2 20-2, and client device 3 20-3 into activity group 1 230-1 and assigns a respective UI engine 45-1 in VM 1 210-1 to perform rendering activities for activity group 1 230-1. Likewise, based on the states 220-2b and 220-Na, the UI engine controller 30 groups the UI requests from client device 2 20-2 and client device N 20-N into activity group 2 230-2 and assigns a respective UI engine 45-2 in VM 2 210-2 to perform rendering activities for activity group 2 230-2. In a similar vein, based on the states 220-3b and 220-Nb, the UI engine controller 30 groups the UI requests from client device 3 20-3 and client device N 20-N into activity group 3 230-3 and assigns a respective UI engine 45-3 in VM M 210-M to perform rendering activities for activity group 3 230-3.

The assignment of the respective pool of UI engines 45-1 as well as the grouping of the requests can be based on information derived from the state information, such as properties of the UIs being requested, properties of the activity group, and/or properties of the UI engine(s) 45. In FIG. 2, based on the states 220-1, 220-2a, and 220-3a, the respective pool of UI engines 45-1 is associated with an application for rendering the UIs being requested. In another example, based on the size of a respective group 230, the UI engine controller 30 may assign a pool of UI engines 45 that has sufficient resources allocated to ensure fast rendering.

In some embodiment, properties of the UIs include the screen that is being rendered, such as a TV guide, a video-on-demand (VOD) store, recordings screen, etc. Based on the properties of the UIs and the applications associated with rendering the UIs, the UI engine controller 30 assigns the UI engine 45 that is configured to support the operations of an application to render the UIs, e.g., grouping requests for TV guide and assigns a UI engine 45 configured for TV guide rendering application to serve the group of requests. In some embodiments, properties of the UIs include the content source (e.g., an overlay). The UI engine controller 30 can use the content source for grouping UI requests, e.g., grouping requests for rendering an overlay over channel 1, channel 2, VOD A, and VOD B etc.

Grouping the UI requests into activity groups 230 and using a pool of UI engines 45 to serve a respective activity group 230 have several advantages. First, as will be described in further detail below, the grouping allows the UI engine 45 to re-use rendered UI objects for faster rendering. Second, the grouping also allows the UI engine controller 30 to allocate appropriate resources to the UI engine pool 45. In particular, the grouping allows the UI engine controller 30 to scale up or down the UI engine pool 45 in the VM 210 based on context. For example, for a large activity group 230, e.g., many UI requests for a popular live event, the UI engine controller 30 can allocate more processing time from the hardware 40 to a VM 210 and/or a UI engine pool 45. Alternatively, the UI engine controller 30 can increase the size of the UI engine pool in the VM 210 to meet the high demand. On the other hand, for a smaller group of requests, e.g., UI requests during off-peak hours, the UI engine controller 30 allocates less processing time from the hardware 40 to the VM 210 and/or the UI engine pool 45. Alternatively, the UI engine controller 30 can decrease the size of the UI engine pool 45 in VM 210-1 to free up resources for other processing tasks. Third, the grouping allows the UI engine controller 30 to identify common activities in the UI requests and maintain the pool size to efficiently use the resources on the cloud computing platform 10. For example, even with a large activity group, upon identifying many common activities in the activity group, the UI engine controller 30 may maintain the pool size upon determining that the UI engines 45 can utilize many shared UI objects to render UIs efficiently.

It should be noted that the grouping of the UI requests and the assignments to the UI engines 45 are dynamic. In other words, the connections between the client devices 20 and the UI engines 45 are dynamic. In some embodiments, upon receiving a UI request, the UI engine controller 30 identifies the request being associated with a watch session, derives the corresponding state associated with the request, and determines whether a connection for the watch session has been established, e.g., whether a connection belongs to a group 230 connecting the client device 20 to a pool of the UI engines 45. A connection between a respective pool of UI engines 45 and/or a respective UI engine 45 in a pool and a client device may be utilized for the watch session if the state information associated with the request indicates that the request can be served by the same UI engine 45 or the same pool of UI engines 45. In the case of finding an existing connection, the respective pool of UI engines 45 or the respective UI engine 45 can continue to render UI for the client device 20. On the other hand, in the case of not finding an existing connection, the UI engine controller 30 establishes a connection for the watch session and associates the connection with a respective activity group 230 based on the state information, so that a respective pool of UI engines 45 and/or a respective UI engine 45 can render UI for the watch session.

Figure 3:
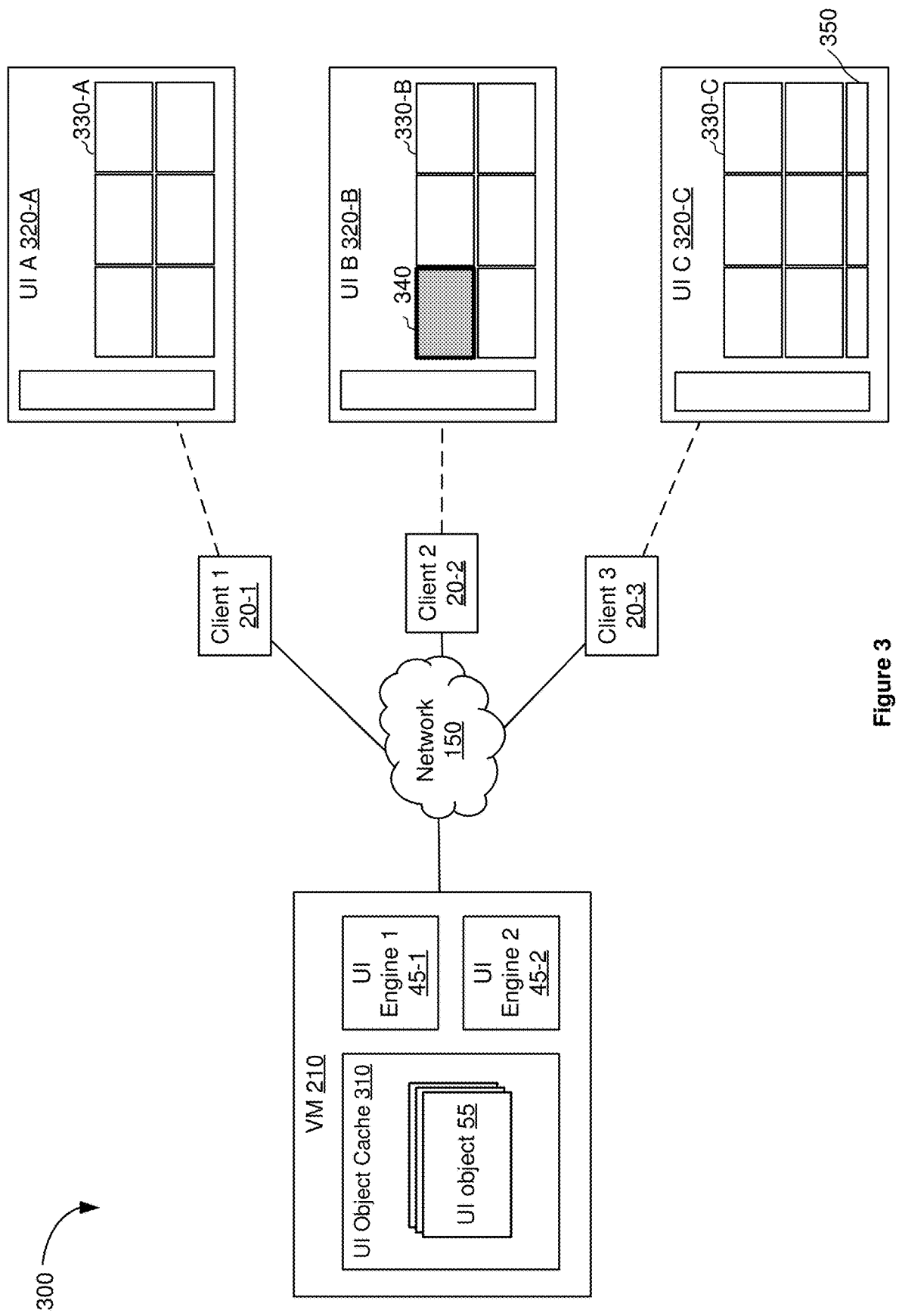
FIG. 3 is a block diagram illustrating UI object sharing in the exemplary virtual set top system, in accordance with some embodiments.

FIG. 3 is a diagram 300 illustrating UI object sharing in the exemplary virtual set top system 100 (FIG. 1) in accordance with some embodiments. In some embodiments, the virtual machine 210, as described above with reference to FIGS. 1 and 2, hosts a pool of UI engines 45, e.g., UI engine 1 45-1 and UI engine 2 45-2. As such, the exemplary pool of UI engines 45 within VM 210 has a density value of 2. In some embodiments, the pool of UI engines 45 provides virtualized STB s for the multiple client devices 20. The pool of UI engines 45 renders personalized UIs for the client devices 20, e.g., rendering UI A 320-A for client device 1 20-1, rendering UI B 320-B for client device 2 20-2, and rendering UI C 320-C for client device 3 20-3. The rendered UIs are then delivered to the client devices 20 for display via the network 150.

Many user behaviors on TV UIs are predictable and repeated, e.g., viewing home page, VOD store page, TV guide, recording, etc. Thus, TV UI renderings fit into a model that benefits from segmenting the UIs, where caching the segments would return a high cache hit rate. In other words, when multiple requests from multiple clients request the same UIs, the same cached rendered UI segments can be re-used many times. As such, the VM 210 and the density of the VM 210, e.g., the number of UI engines 45 in the VM 210, can be configured by the UI engine controller to allow a few UI engines 45 (or a single VM 210) rendering for many client devices 20, e.g., 2 UI engines 45 rendering for 3 (or more) client devices 20.

In the exemplary environment as shown in FIG. 3, UI A 320-A requested by client device 1 20-1, UI B 320-B requested by client device 2 20-2, and UI C 320-C requested by client device 3 20-3 have many commonalities. For example, the layout is common across UI A-C 320-A, 320-B, and 320-C. Further, the certain static content, such as a tile 330-A in UI A 320-A, a tile 330-B in UI B 320-B, and a tile 330-C in UI C 320-C, is displayed as the same image in UI A-C 320-A, 320-B, and 320-C. As such, in some embodiments, upon receiving a request for rendering such UI elements, a respective UI engine 45, e.g., UI engine 1 45-1, renders the UI objects corresponding to such UI elements and stores the rendered UI objects 55 in a shared UI object cache 310 (e.g., as part of the cloud storage 50, FIG. 1). The rendered UI objects 55 can then be shared by other UI engines 45 in the VM 210. For example, UI engine 2 45-2 can re-use the rendered UI objects 55 when UI engine 2 45-2 renders UI B 320-B for client 2 20-2 without re-rendering. The re-use instead of re-rendering reduces the amount of UI rendering and saves cloud computational resources.

Also, in the context of TV UI rendering and display, many transitions between different TV UIs are predictable, e.g., scrolling up and down across different categories, checking a preview, selecting the recommended item, etc. For example, upon viewing UI A 320-A, many users may perform the same action of selecting the most frequently viewed item, e.g., by highlighting a tile 340 that is displayed as the first item as shown in UI B 320-B. As such, the transition from UI A 320-A to UI B 320-B can be recorded and rendered as a video segment and stored in the shared UI object cache 310 as the rendered UI objects 55. In another example, when viewing UI A 320-A, many users may perform the same action of scrolling down to a certain category, e.g., by requesting UI C 320-C that includes another row of tiles 350. As such, the transition from UI A 320-A to UI C 320-C can be recorded and rendered as a video segment and stored in the shared UI object cache 310 as the rendered UI objects 55. The recording of the short segments corresponding to the transitions, user activities, and/or user interactions reduces the amount of UI re-rendering and saves cloud computational resources.

It should be noted that although in FIG. 3, the UI object cache 310 is shown as part of the VM 210 and shared by UI engine 1 45-1 and UI engine 2 45-2, the UI object cache 310 can be separate and distinct from the VM 210. In some embodiments, the UI object cache 310 can be a centralized cache that is shared by multiple virtual machines, e.g., on a separate virtual machine, instance, and/or device. Those skilled in the art will appreciate from the present disclosure that various other features and configurations have not been illustrated for the sake of brevity, and so as not to obscure more pertinent aspects of the embodiments disclosed herein.

FIGS. 4A and 4B are diagrams 400A and 400B illustrating UI engine pooling according to properties of UI requests in accordance with some embodiments. In some embodiments, the pooling of UI engines is performed by the UI engine controller 30 as described above with reference to FIGS. 1 and 2. In some embodiments, the UI engine controller groups the UI requests from multiple client devices based on the states of the UIs requested. Having grouped the UI requests, the UI engine controller 30 assigns a pool of UI engines in a VM to render the UIs, adjusts the resources allocated to the VM and/or the pool of UI engines, and/or allocating additional VMs so that the rendering delay is within a threshold in accordance with some embodiments.

In FIG. 4A, during a first period 401a, the UI engine controller assigns a pool of UI engines 45-a in a VM 210-A to render UI for an activity group and configures the pool of UI engines 45-a with a density (N) value of 10, e.g., a pool of 10 UI engines rendering UIs in response to the UI requests in the activity group. When the activity group grows larger during a second period 401b, e.g., streaming a popular event, the UI engine controller increases the density of the pool of UI engines 45-b in VM 210-b to 20. With the additional resources, the pool of UI engines 45-b would be able to meet the increased demand for UIs and still provide fast UI rendering during the second period 401b. In some embodiments, once the size of the activity group decreases during a third period 401c, e.g., after the popular event ends, the UI engine controller decreases the density of the pool of UI engines 45-c in VM 210-c to 5 to free up resources.

In some embodiments, the UI engine controller predicts the demands for UI based on the state information and adjusts the density of the pool of UI engines according to the prediction. In other words, the UI engine controller can proactively or reactively configure the UI engine pool to ensure fast rendering. For example, the UI engine controller can group the UI requests based on geographical data derived from the state information upon receiving the session state cookies along with the requests from client devices. Upon obtaining popular local event schedule, e.g., knowing the popular local event would be broadcasted during the second period 401b in a particular geographical region, the UI engine controller can prepare the pool of UI engines by proactively increasing the density of the pool of UI engines 45-b in the VM 210-b at the beginning of the second period 401b. In another example, based on historical data derived from the state information, the UI engine controller determines that the third period 401c is historically associated with low demand, e.g., during early morning hours when fewer people request media content and/or UIs. Accordingly, the UI engine controller automatically decreases the density of the pool of UI engines 45-c during certain time slot(s).

In FIG. 4B, in some embodiments, the UI engine controller determines the density of the pool of UI engines 45-d based on not only the group size 405B, but also on characteristics and/or properties of the UIs being requested, such as the commonalities of UI interactions and/or UI elements. For example, relative to a first period 401c, the number of UI requests increases during a second period 401d. However, the UI engine controller determines that the requested UIs have a significant number of common elements and/or common transitions, as indicated by the rising cache hit rate 410. Even though the number of UI requests rises and the activity group size 405-B increases, many UI objects in the shared cache are re-used without consuming the cloud resources to re-render. As a result, key metrics from the pool of UI engines 45-*d*, such as the rendering delay 420, CPU usage, and/or memory usage, etc., do not increase significantly to be above a threshold 422. In some embodiments, the UI engine controller uses the key metrics from the pool of UI engines 45-*d* as one of the bases to scale up or down. In FIG. 4B, because the rendering delay 420 is still at an acceptable level, instead of increasing the density of the pool of UI engines 45-*d* in the VM 210-*d*, the UI engine controller maintains the density for the second period 401*d*, e.g., N=10 for both the first period 401*c* and the second period 401*d*.

Figure 5A:
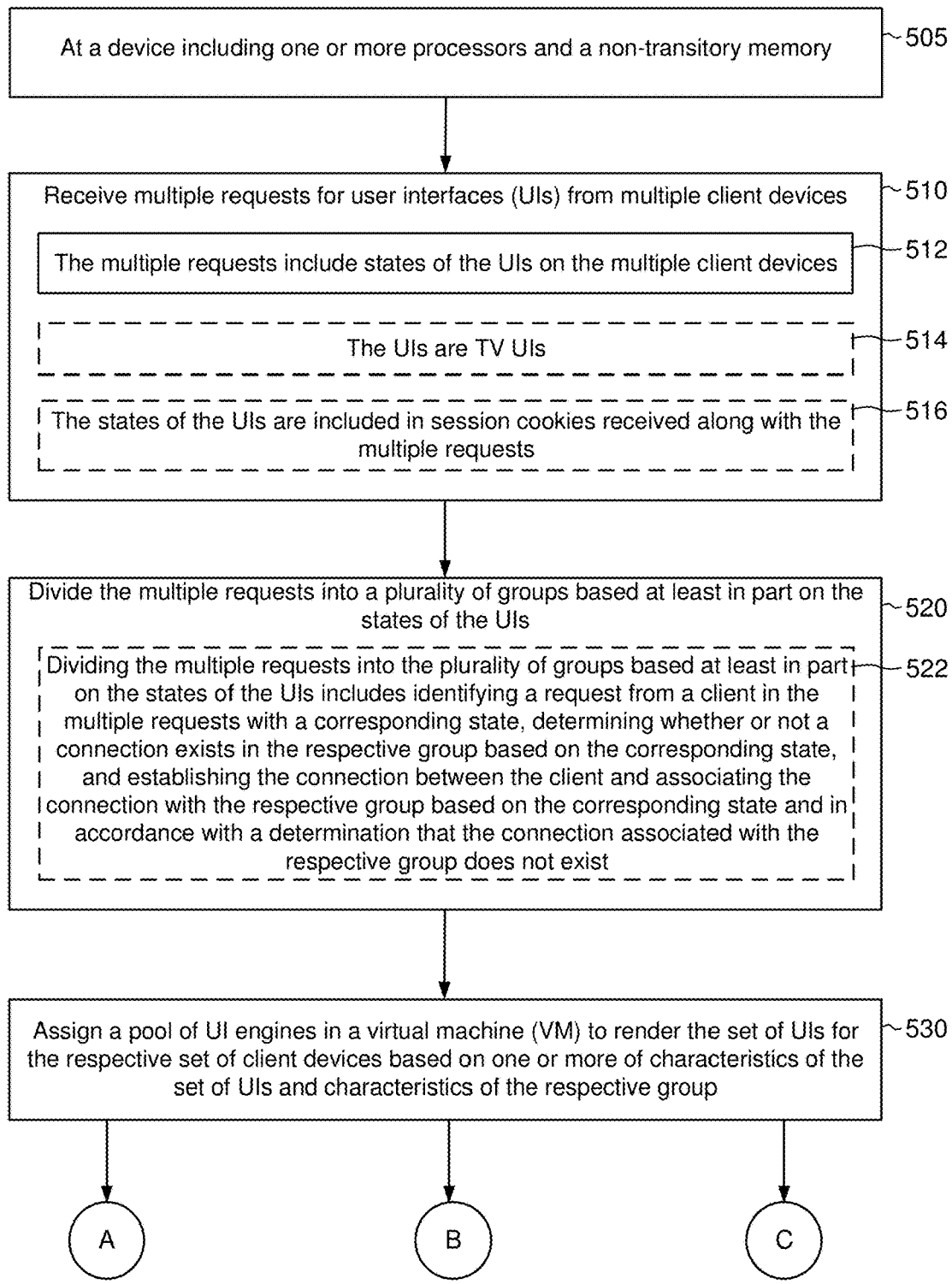

FIGS. 5A and 5B are flowcharts illustrating a method 500 of pooling UI rendering engines for UI rendering in the virtual set top system 100 (FIG. 1) in accordance with some embodiments. In some embodiments, as represented by block 505 in FIG. 5A, the method 500 is performed at a device including one or more processors and a non-transitory memory, e.g., a device providing the cloud computing platform 10 (FIG. 1) and in particular a device supporting the UI engine controller 30 (FIG. 1). Briefly, the method 500 includes receiving multiple requests for user interfaces (UIs) from multiple client devices, wherein the multiple requests include states of the UIs on the multiple client devices; dividing the multiple requests into a plurality of groups based at least in part on the states of the UIs, wherein a respective group of the plurality of groups corresponds to requests for a set of UIs from a respective set of client devices; and assigning a pool of UI engines in a virtual machine (VM) to render the set of UIs for the respective set of client devices based on one or more of characteristics of the set of UIs and characteristics of the respective group.

To that end, the method 500 begins with the UI engine controller receiving multiple requests for user interfaces (UIs) from multiple client devices, as represented by block 510, wherein the multiple requests include states of the UIs on the multiple client devices, as represented by block 512 in FIG. 5A. In some embodiments, as represented by block 514, the UIs are TV UIs. Further, in some embodiments, as represented by block 516, the states of the UIs are included in session cookies received along with the multiple requests. As explained above with reference to FIG. 3, many user behaviors on TV UIs are predictable and repeated. The information in the session cookies received along with the multiple (often simultaneous) requests reflects the repetitive nature of such user behaviors on TV UIs. As such, the UI engine controller identifies the common activities in the multiple requests and pools the UI engines to reduce the amount of processing spent on repetitive tasks, thus realizing cost savings.

The method 500 continues, as represented by block 520, with the UI engine controller dividing the multiple requests into a plurality of groups based at least in part on the states of the UIs, wherein a respective group of the plurality of groups corresponds to requests for a set of UIs from a respective set of client devices. In some embodiments, as represented by block 522, dividing the multiple requests into the plurality of groups based at least in part on the states of the UIs includes identifying a request from a client in the multiple requests with a corresponding state; determining whether or not a connection exists in the respective group based on the corresponding state; and establishing the connection between the client and associating the connection with the respective group based on the corresponding state and in accordance with a determination that the connection associated with the respective group does not exist.

For example, as shown in FIG. 2, the UI engine controller 30 groups the requests into the groups 230 based on the state information 220. Further as shown in FIG. 2, based on the states 220, connections are established between the UI engine(s) 45 and a respective client device 20. The connections are established and maintained by the UI engine controller 30 based on the states 220. As such, in response to some UI requests during certain watch sessions, existing connections between the UI engine(s) 45 and the respective client device 20 can be re-used. On the other hand, in response to some other UI requests, new connections may be established and associated with the activity groups 230 based on the state information.

Grouping the requests allows the UI engine controller to analyze the requests and identify common activities in the requests. Further, grouping the request allows the UI engine controller to identify activities and allocate cloud resources, such that a few UI engines can render for many client devices based on activities. Thus, relative to previously existing methods of having a dedicated UI engine as a virtualized STB render UIs for each client, the virtual set top system described herein reduces the amount of resources allocated for cloud UI rendering and lowers the cost.

Still referring to FIG. 5A, the method 500 further continues, as represented by block 530, with the UI engine controller assigning a pool of UI engines in a virtual machine (VM) to render the set of UIs for the respective set of client devices based on one or more of characteristics of the set of UIs and characteristics of the respective group. For example, in FIG. 2, the UI engine controller 30 assigns the requests from client device 1 20-1, client device 2 20-2, and client device 3 20-3 to the pool of UI engines 45-1 in VM 1 210-1 based on the states 220, such as geographical regions, networks, user groups, UI interactions associated with the requests, UIs requested, etc. In another example, in FIG. 4A, the UI engine controller assigns the pool of UI engines 45-*a* to render UI requests during period 401*a* based on the UI requests group size 405-A during the first period 401*a* and the VM density value of 10. In another example, in FIG. 3, VM 210 and the pool of UI engines 45-1 and 45-2 are assigned to the group of requests for UI A 320-A, UI B 320-B, and UI C 320-C based on the user actions and/or characteristics of the UIs, such as displaying UI A 320-A, highlighting a tile in UI B 320-B, and scrolling down to display UI C 320-C.

In some embodiments, the UI engine controller also takes into consideration properties of the VM and/or the pool of UI engines, such as the number of UI engines in the pool, the processing time slice allowed to perform certain rendering tasks on the hardware 40 (FIG. 1) (e.g., GPU time slice allocated to execute certain commands), the application associated with the VM, etc. For example, in the scenario illustrated in FIG. 4B, the UI engine controller assigns the pool of UI engines to render the UI requests upon determining that with the capacity of the VM 210-*d* and the pool of UI engines 45-*d*, the rendering delay 420 would be below the threshold 422.

Turning to FIG. 5B, in some embodiments, as represented by block 550, the method 500 further includes maintaining a cache for storing rendered UI objects that are shared by the pool of UI engines, and obtaining a cache hit rate of the rendered UI objects, including a cache hit rate of the rendered UI objects associated with the set of UIs. In such embodiments, as represented by block 552, assigning the pool of UI engines in the VM to render the set of UIs for the respective set of client devices based on the one or more characteristics of the set of UIs and the respective group includes adjusting a density of the pool of UI engines in the VM based on the cache hit rate of the rendered UI objects associated with the set of UIs and in accordance with a rendering delay of the respective group below a threshold.

For example, in FIG. 3, the UI objects 55 in the shared UI object cache 310 are rendered UI objects correspond to elements in UI A 320-A, UI B 320-B, and UI C 320-C as well as interactions with UI A 320-A, UI B 320-B, and UI C 320-C. In FIG. 4B, the UI engine controller determines the cache hit rate 410 of the UI objects corresponding to the requested UIs, where the rising cache hit rate 410 indicates many UI elements and/or user interactions in the requested UIs are common and the UI engines can re-use the rendered UI objects stored in the shared cache for fast rendering. Also shown in FIG. 4B, the UI engine controller adjusts the density of the pool of UI engines by maintaining the density of the pool of UI engines 45-$d$ in the VM 210-$d$ based on the rising cache hit rate 410 and the rendering delay 420 below the threshold 422.

In some embodiments, as represented by block 560, dividing the multiple requests into the plurality of groups based at least in part on the states of the UIs includes dividing the multiple requests into the plurality of groups based on geographics derived from the states of the UI; and the respective group of the plurality of groups corresponds to the requests for the set of UIs from the respective set of client devices proximate a respective geographical region. Further, in such embodiments, as represented by block 562, the method 500 further includes predicting a size of the respective group local to the respective geographical region and adjusting a density of the pool of UI engines in the VM according to the size of the respective group. For example, in FIG. 4A, anticipating the increased demand for streaming a popular local event, the UI engine controller automatically increases the density of the pool of the UI engines according to the local event schedule to normalize the spikes in the demand curve.

In some embodiments, as represented by block 570, the method 500 further includes deploying a plurality of VMs, including the VM, running on the one or more processors, each of the plurality of VMs hosts a respective pool of UI engines and corresponds to a respective application for rendering the UIs. For example, in FIG. 2, the UI engine controller 30 deploys VM 1 210-1, VM 2, . . . , VM M 210-M on top of the hardware 40 (e.g., CPU(s) and/or GPU(s)) for UI rendering and each of the VMs 210 hosts a pool of UI engines 45. The VMs 210 share the resources provided by the hardware 40 and the UI engine controller 30 allocates the resources to the VMs 210 and the pool of engines 45 accordingly.

Figure 6:
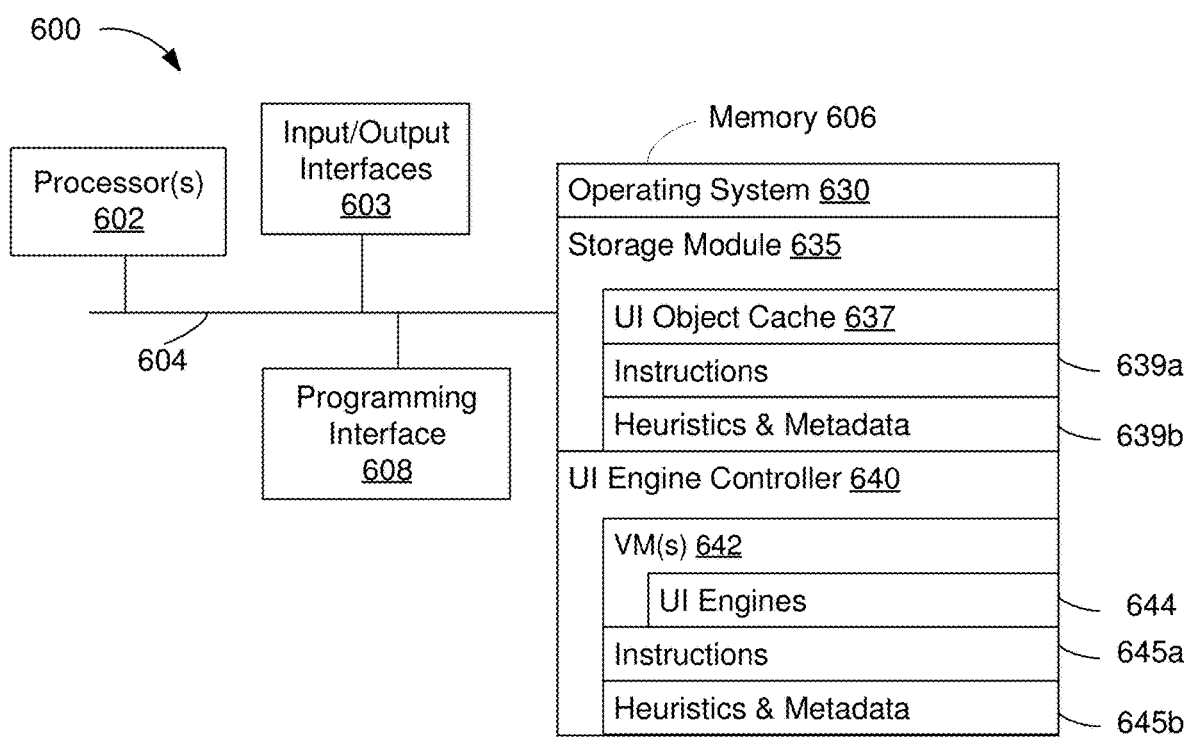
FIG. 6 is a block diagram of a computing device for the exemplary virtual set top system, in accordance with some embodiments.

FIG. 6 is a block diagram of a computing device 600 in an exemplary virtual set top system for UI rendering in accordance with some embodiments. In some embodiments, the computing device 600 corresponds to the UI engine controller 30 in FIG. 1 and performs one or more of the functionalities described above with respect to the UI engine controller. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units or processors 602 (e.g., CPUs and/or GPUs), one or more input/output interfaces 603 (e.g., input devices, sensors, a network interface, a display, etc.), a memory 606, a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the processors 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a storage module 635 and a UI engine controller 640. In some embodiments, one or more instructions are included in a combination of logic and non-transitory memory. The operating system 630 includes procedures for handling various basic system services and for performing hardware dependent tasks.

In some embodiments, the storage module 635 is configured to provide storage for UI rendering, including a UI object cache 637 (e.g., the cloud storage 50 in FIG. 1, the UI object cache 310 in FIG. 3) for storing rendering UI objects (e.g., the UI objects 55 in FIGS. 1 and 3). To that end, the storage module 635 includes a set of instructions 639$a$ and heuristics and metadata 639$b$.

In some embodiments, the UI engine controller 640 (e.g., the UI engine controller 30 in FIGS. 1 and 2) is configured to maintain one or more VMs 642 (e.g., the VMs 210 in FIG. 2) running on the one or more processors 602 and each of the VM(s) 642 hosts a pool of UI engines 644 (e.g., the UI engines 45 in FIGS. 1-3 and 4A-4B). To that end, the UI engine controller 640 includes a set of instructions 645$a$ and heuristics and metadata 645$b$.

Although the storage model 635 and the UI engine controller 640 are illustrated as residing on a single computing device 600, it should be understood that in some other embodiments, any combination of the storage model 635 and the UI engine controller 640 can reside in separate computing devices in various embodiments. For example, in some embodiments, each of the storage model 635 and the UI engine controller 640 resides on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a device including one or more processors and a non-transitory memory:
receiving multiple requests for user interfaces (UIs) from multiple client devices, wherein the multiple requests include states of the UIs on the multiple client devices;
dividing the multiple requests into a plurality of groups based at least in part on the states of the UIs, wherein a respective group of the plurality of groups corresponds to requests for a set of UIs from a respective set of client devices; and
assigning a pool of UI engines in a virtual machine (VM) to render the set of UIs for the respective set of client devices based on one or more of characteristics of the set of UIs and characteristics of the respective group.

2. The method of claim 1, wherein the UIs are TV UIs.

3. The method of claim 1, wherein the states of the UIs are included in session cookies received along with the multiple requests.

4. The method of claim 1, wherein dividing the multiple requests into the plurality of groups based at least in part on the states of the UIs includes:
identifying a request from a client in the multiple requests with a corresponding state;
determining whether or not a connection exists in the respective group based on the corresponding state; and
establishing the connection between the client and associating the connection with the respective group based on the corresponding state and in accordance with a determination that the connection associated with the respective group does not exist.

5. The method of claim 1, further comprising:
maintaining a cache for storing rendered UI objects that are shared by the pool of UI engines; and
obtaining a cache hit rate of the rendered UI objects, including a cache hit rate of the rendered UI objects associated with the set of UIs.

6. The method of claim 5, wherein assigning the pool of UI engines in the VM to render the set of UIs for the respective set of client devices based on the one or more characteristics of the set of UIs and the respective group includes:
adjusting a density of the pool of UI engines in the VM based on the cache hit rate of the rendered UI objects associated with the set of UIs and in accordance with a rendering delay of the respective group below a threshold.

7. The method of claim 1, wherein:
dividing the multiple requests into the plurality of groups based at least in part on the states of the UIs includes dividing the multiple requests into the plurality of groups based on geographics derived from the states of the UI; and
the respective group of the plurality of groups corresponds to the requests for the set of UIs from the respective set of client devices proximate a respective geographical region.

8. The method of claim 7, further comprising:
predicting a size of the respective group local to the respective geographical region; and
adjusting a density of the pool of UI engines in the VM according to the size of the respective group.

9. The method of claim 1, further comprising:
deploying a plurality of VMs, including the VM, running on the one or more processors, each of the plurality of VMs hosts a respective pool of UI engines and corresponds to a respective application for rendering the UIs.

10. A system comprising:
one or more processors;
a non-transitory memory; and
one or more programs stored in the non-transitory memory, which, when executed, cause the one or more processors to perform operations comprising:
receiving multiple requests for user interfaces (UIs) from multiple client devices, wherein the multiple requests include states of the UIs on the multiple client devices;
dividing the multiple requests into a plurality of groups based at least in part on the states of the UIs, wherein a respective group of the plurality of groups corresponds to requests for a set of UIs from a respective set of client devices; and assigning a pool of UI engines in a virtual machine (VM) to render the set of UIs for the respective set of client devices based on one or more of characteristics of the set of UIs and characteristics of the respective group.

11. The system of claim 10, wherein the UIs are TV UIs.

12. The system of claim 10, wherein the states of the UIs are included in session cookies received along with the multiple requests.

13. The system of claim 10, wherein dividing the multiple requests into the plurality of groups based at least in part on the states of the UIs includes:
identifying a request from a client in the multiple requests with a corresponding state;
determining whether or not a connection exists in the respective group based on the corresponding state; and
establishing the connection between the client and associating the connection with the respective group based on the corresponding state and in accordance with a determination that the connection associated with the respective group does not exist.

14. The system of claim 10, wherein the operations further comprise:
maintaining a cache for storing rendered UI objects that are shared by the pool of UI engines; and
obtaining a cache hit rate of the rendered UI objects, including a cache hit rate of the rendered UI objects associated with the set of UIs.

15. The system of claim 14, wherein assigning the pool of UI engines in the VM to render the set of UIs for the respective set of client devices based on the one or more characteristics of the set of UIs and the respective group includes:
adjusting a density of the pool of UI engines in the VM based on the cache hit rate of the rendered UI objects associated with the set of UIs and in accordance with a rendering delay of the respective group below a threshold.

16. The system of claim 10, wherein:
dividing the multiple requests into the plurality of groups based at least in part on the states of the UIs includes
dividing the multiple requests into the plurality of groups based on geographics derived from the states of the UI; and
the respective group of the plurality of groups corresponds to the requests for the set of UIs from the respective set of client devices proximate a respective geographical region.

17. The system of claim 16, wherein the operations further comprise:
predicting a size of the respective group local to the respective geographical region; and
adjusting a density of the pool of UI engines in the VM according to the size of the respective group.

18. The system of claim 10, wherein the operations further comprise:
deploying a plurality of VMs, including the VM, running on the one or more processors, each of the plurality of VMs hosts a respective pool of UI engines and corresponds to a respective application for rendering the UIs.

19. A non-transitory computer-readable media including instructions, which, when executed by a device including one or more processors, cause the device to:
receive multiple requests for user interfaces (UIs) from multiple client devices, wherein the multiple requests include states of the UIs on the multiple client devices;
divide the multiple requests into a plurality of groups based at least in part on the states of the UIs, wherein a respective group of the plurality of groups corresponds to requests for a set of UIs from a respective set of client devices; and
assign a pool of UI engines in a virtual machine (VM) to render the set of UIs for the respective set of client devices based on one or more of characteristics of the set of UIs and characteristics of the respective group.

20. The non-transitory computer-readable media of claim 19, wherein the UIs are TV UIs.

* * * * *